United States Patent
Wang et al.

(10) Patent No.: US 12,107,649 B2
(45) Date of Patent: Oct. 1, 2024

(54) NOISE FILTERING OF CHANNEL-STATE INFORMATION IN WIRELESS COMMUNICATION

(71) Applicant: MEDIATEK INC., Hsinchu (TW)

(72) Inventors: Chao-Peng Wang, Hsinchu (TW); Tsung-Han Tsai, Hsinchu (TW); Shun-Yong Huang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 338 days.

(21) Appl. No.: 17/550,104

(22) Filed: Dec. 14, 2021

(65) Prior Publication Data
US 2022/0190898 A1 Jun. 16, 2022

Related U.S. Application Data

(60) Provisional application No. 63/166,286, filed on Mar. 26, 2021, provisional application No. 63/126,083, filed on Dec. 16, 2020.

(51) Int. Cl.
H04B 7/06 (2006.01)
H04B 1/10 (2006.01)
H04W 28/06 (2009.01)

(52) U.S. Cl.
CPC ............. *H04B 7/0626* (2013.01); *H04B 1/10* (2013.01); *H04W 28/06* (2013.01)

(58) Field of Classification Search
CPC ..... H04L 25/0226; H04L 1/00; H04L 1/1671; H04L 2025/03426; H04B 17/20; H04B 7/06; H04B 1/10
See application file for complete search history.

(56) References Cited

U.S. PATENT DOCUMENTS

| | | | | |
|---|---|---|---|---|
| 7,321,926 B1* | 1/2008 | Zhang | ................ | H04L 67/1017 718/104 |
| 7,814,204 B1* | 10/2010 | Wang | .................... | H04L 67/02 709/227 |
| 9,071,474 B1* | 6/2015 | Zhang | ................... | H04L 1/0045 |
| 9,742,590 B2* | 8/2017 | Abraham | .............. | H04L 1/1671 |

(Continued)

FOREIGN PATENT DOCUMENTS

| CN | 107431567 A | 12/2017 |
|---|---|---|
| CN | 111726199 A | 9/2020 |

OTHER PUBLICATIONS

Chinese language office action dated Oct. 10, 2023, issued in application No. CN 202111538380.0.

(Continued)

*Primary Examiner* — Derrick W Ferris
*Assistant Examiner* — Won Jun Choi
(74) *Attorney, Agent, or Firm* — McClure, Qualey & Rodack, LLP (57) ABSTRACT

A device is provided, which includes one or more antennas and a circuit. The circuit is configured to receive a packet from a transmitter device through the antennas, and obtain channel-state information from the received packet. The circuit includes one or more filters to filter out or recognize the received packet that complies with one or more preset conditions. The circuit uses the channel-state information of the received packet, which complies with the one or more preset conditions, to estimate a status of a channel between the transmitter device and the device.

12 Claims, 12 Drawing Sheets

(56) References Cited

U.S. PATENT DOCUMENTS

| | | |
|---|---|---|
| 10,075,873 B2 | 9/2018 | Merlin et al. |
| 2011/0103247 A1 | 5/2011 | Chen et al. |
| 2015/0312831 A1* | 10/2015 | Sang ............... H04W 36/00837 370/236 |
| 2016/0164646 A1 | 6/2016 | Kwon |

OTHER PUBLICATIONS

Chinese language office action dated Jul. 18, 2022, issued in application No. TW 110147133.

* cited by examiner

NOISE FILTERING OF CHANNEL-STATE INFORMATION IN WIRELESS COMMUNICATION

CROSS REFERENCE TO RELATED APPLICATIONS

This application claims the benefits of U.S. Provisional Application No. 63/126,083, filed on Dec. 16, 2020, and U.S. Provisional Application No. 63/166,286, filed on Mar. 26, 2021, the entirety of which are incorporated by reference herein.

BACKGROUND OF THE INVENTION

Field of the Invention

The present invention relates to wireless communication, and, in particular, to an apparatus and a method for filtering noises of channel-state information in wireless communication.

Description of the Related Art

In wireless communication, channel-state information (CSI) refers to the known channel properties of a communication link. This information describes how a signal propagates from the transmitter to the receiver, and represents the combined effect of, for example, scattering, fading, and power decay with distance. The CSI is often used to estimate the status of uplink/downlink communication channels between a transmitter device and a receiver device, such as an access point (AP) and a station (STA). However, since the channel condition varies, instantaneous CSI needs to be estimated on a short-term basis. When the receiver device continuously receives packets from the transmitter device, the receiver device may find that the CSI quality indicated by the received packets may vary significantly, resulting in erroneously estimating the status of the communication channel.

Accordingly, there is demand for an apparatus and a method for filtering noises of channel-state information in wireless communication.

BRIEF SUMMARY OF THE INVENTION

An embodiment of the present invention provides a device. The device includes one or more antennas and a circuit. The circuit is configured to receive a packet from a transmitter device through the antennas, and obtain channel-state information from the received packet. The circuit comprises one or more filters to filter out or recognize the received packet that complies with one or more preset conditions. The circuit uses the channel-state information of the received packet, which complies with the one or more preset conditions, to estimate a status of a channel between the transmitter device and the device.

Another embodiment of the present invention provides a method. The method includes the following steps: receiving a packet from a transmitter device through one or more antennas of a receiver device; obtaining channel-state information from the received packet; filtering out or recognizing the received packet that complies with one or more preset conditions; and using the channel-state information of the received packet, which complies with the one or more preset conditions, to estimate a status of a channel between the transmitter device and the receiver device.

Yet another embodiment of the present invention provides a method. The method includes the following steps: receiving a packet from a transmitter device through one or more antennas of a receiver device; obtaining channel-state information from the received packet; classifying the received packet that complies with one or more preset conditions; and using the classified channel-state information of the received packet to estimate a status of a channel between the transmitter device and the receiver device.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

The following description is presented to enable one of ordinary skill in the art to make and use the invention, and is provided in the context of a patent application and its requirements. Various modifications to the embodiments and the generic principles and features described herein will be readily apparent to those skilled in the art. Thus, the present invention is not intended to be limited to the embodiments shown, but is to be accorded the widest scope consistent with the principles and features described herein.

Figure 1:
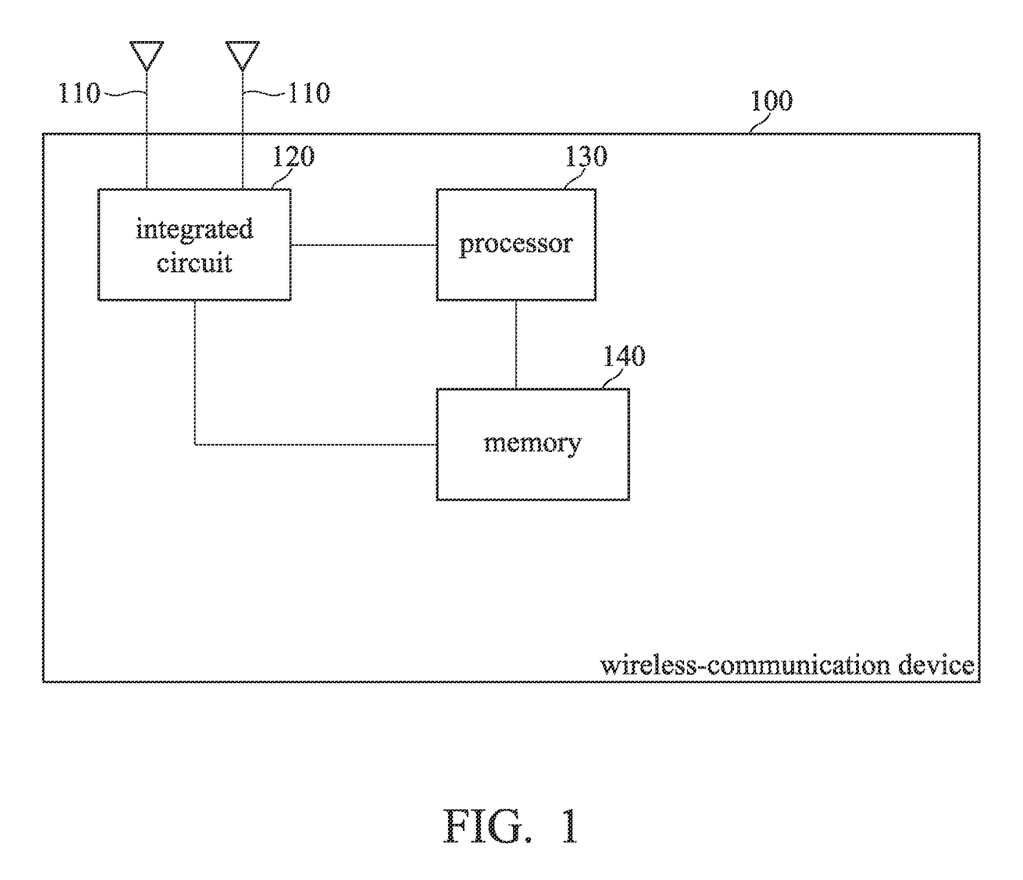
FIG. 1 is a diagram of a wireless-communication device in accordance with an embodiment of the invention.

FIG. 1 is a diagram of an apparatus in accordance with an embodiment of the invention.

The wireless-communication device 100 may include one or more antennas 110, an integrated circuit 120, a processor 130, and a memory 140. The antennas 110 may transmit and receive radio frequency (RF) signals. The integrated circuit 120 is coupled to the antennas 110, and the integrated circuit 120 may include one or more transceivers which may receive RF signal from the antennas 110, convert them to baseband signals, and send the baseband signals to the processor 130. The transceivers may also convert the baseband signals from the processor 130, convert them to RF signal, and send out the RF signals to antennas 110. In some embodiments, the integrated circuit 120 may support functions of SU-MIMO (single-user multi-input multi-output) and MU-MIMO (multi-user multi-input multi-output), but the disclosure is not limited thereto.

The processor 130 may be a central processing unit (CPU), a general-purpose processor, a digital signal processor (DSP), or a microcontroller, but the disclosure is not limited thereto. In some embodiments, the integrated circuit 120 may be a Wi-Fi chip, and the integrated circuit 120 and the processor 130 may be implemented by a system-on-chip (SoC), but the disclosure is not limited thereto. The memory 140 may be a volatile memory or a non-volatile memory. For example, the volatile memory may be a static random access memory (SRAM) or a dynamic random access memory (DRAM), and the non-volatile memory may be a flash memory, a read-only memory (ROM), an erasable programmable read-only memory (EPROM), or an electrically erasable programmable read-only memory (EEPROM), but the disclosure is not limited thereto. In addition, the memory 140 may store instructions or firmware that can be executed by the processor 130 to control operations of the wireless-communication device 100.

Figure 2A:
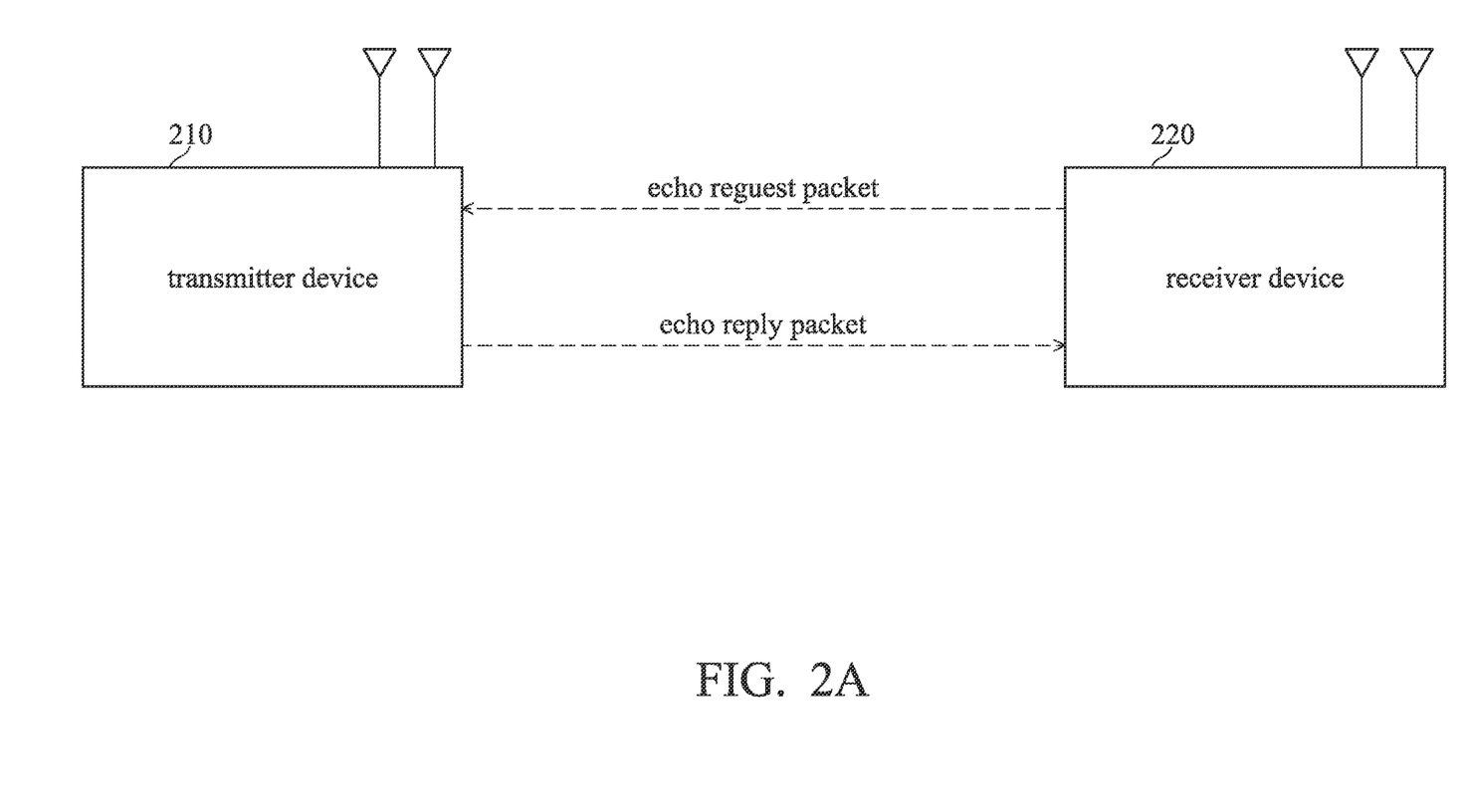
FIG. 2A is a diagram of wireless communication between a transmitter device and a receiver device in accordance with an embodiment of the invention.

FIG. 2A is a diagram of wireless communication between a transmitter device and a receiver device in accordance with an embodiment of the invention.

As depicted in FIG. 2A, the transmitter device 210 and receiver device 220 may be Wi-Fi devices. For ease of description, the transmitter device 210 may be an access point (AP), and the receiver device 220 may be a station (STA), such as a legacy station being a non-HT station (e.g., IEEE 802.11a/g station), an HT station (e.g., IEEE 802.11n station), a VHT (Very High Throughput) station (e.g., IEEE 802.11ac station), an EHT (Extremely High Throughput) station, or an HE (High-Efficiency) Wi-Fi station (e.g., IEEE 802.11ax station).

The transmitter device 210 may repeatedly transmit Rx packets to the receiver device 220. For example, an Rx packet may be in a legacy or HT (high-throughput) packet format, such as a Non-HT PPDU (physical protocol data unit) or an HT-mixed-format PPDU. The transmitter device 210 may include a channel-estimation module (e.g., may be implemented by hardware, software, or a combination thereof) to report the channel coefficients (i.e., channel-state information) using L-LTF (legacy long-training field) or HT-LTF (high throughput long-training field) symbols. More examples will be shown in the embodiments of FIGS. 3A and 3B. For example, the channel station information obtained from the received packet can be used by the receiver device 220 to estimate the status of the channel between the transmitter device 210 and the receiver device 220.

Figure 3A:
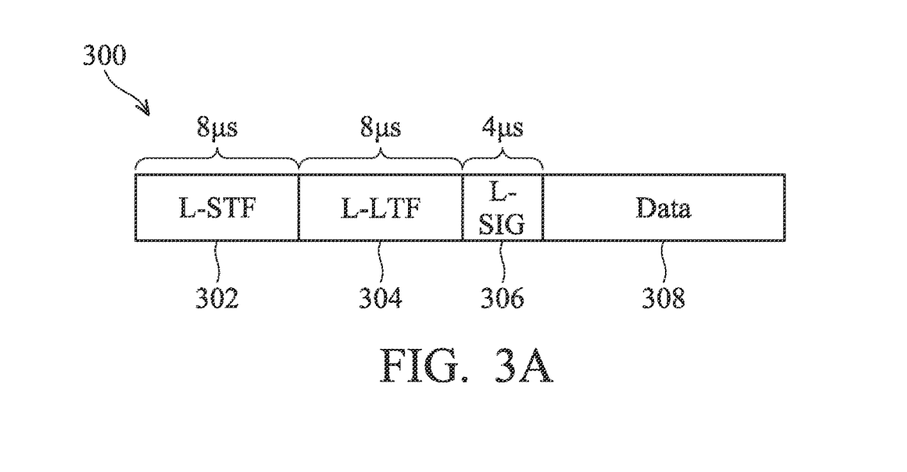
FIG. 3A illustrates a Non-HT format PPDU in accordance with an embodiment of the invention.

FIG. 3A illustrates a Non-HT format PPDU in accordance with an embodiment of the invention.

The non-HT format PPDU 300 may be used for communicating with non-HT stations, which may include stations configured to communicate in accordance with an IEEE 802.11a or IEEE 802.11g standard. In IEEE 802.11a/g, the packet structure comprises a Legacy Short Training Field (L-STF) 302, a Legacy Long Training Field (L-LTF) 304, and the L-SIG (Legacy Signal) 306 which made up the preamble. The preamble is followed by a data field 308. The L-SIG 306 provides information about the data field 308 including the coding and modulation (rate) and the length. For example, the L-LTF 304 in the non-HT format PPDU 300 can be used to report the channel coefficients (e.g., I/Q samples) in the legacy mode.

Figure 3B:
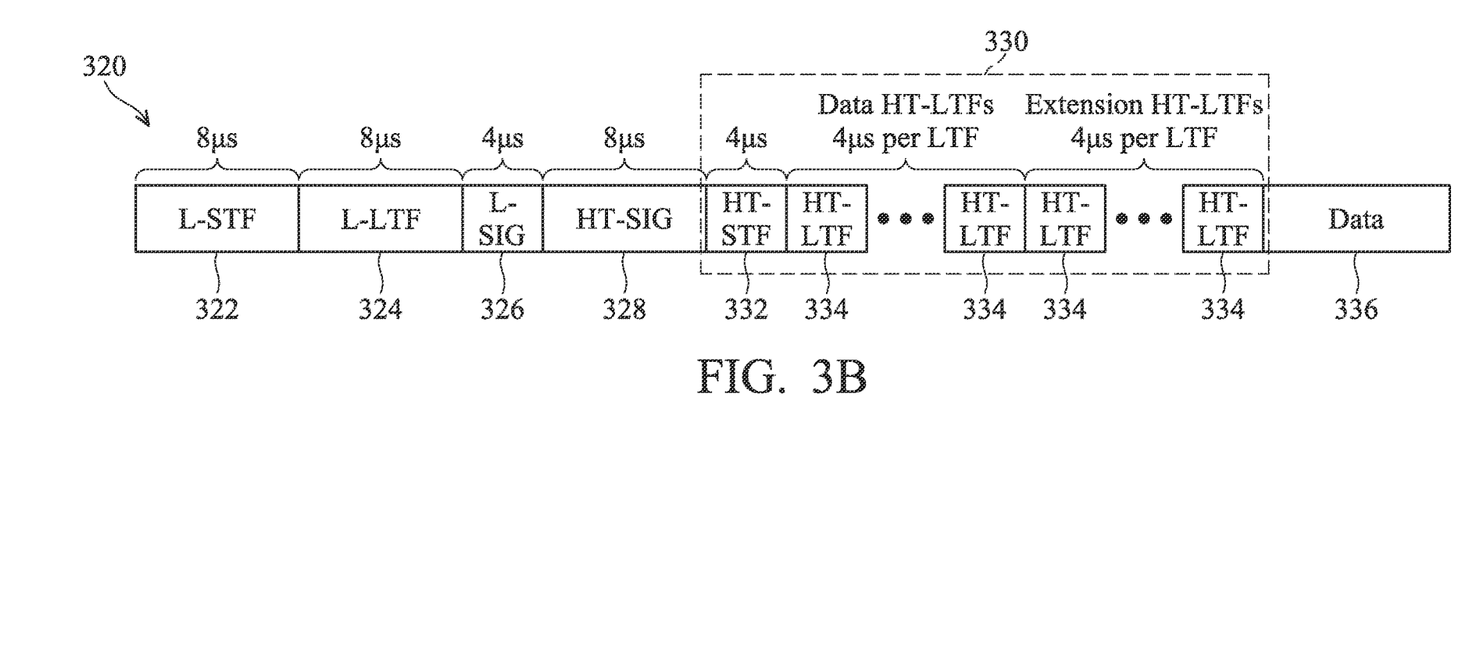
FIG. 3B illustrates an HT-mixed format PPDU in accordance with an embodiment of the invention.

FIG. 3B illustrates an HT-mixed format PPDU in accordance with an embodiment of the invention.

The HT-mixed format PPDU 320 may be used for communicating with HT stations, which may include stations configured to communicate in accordance with an IEEE 802.11n standard. In IEEE 802.11n, the packet structure allows the IEEE 802.11n devices to coexist with IEEE 802.11a/g devices and therefore included the legacy preamble portion of the packet to be used at the beginning of the transmission. For example, the fields 322, 324, and 326 in FIG. 3B are respectively similar to fields 302, 304, and 306 shown in FIG. 3A. The IEEE 802.11n transmission sets the rate field of the L-SIG 326 to a fixed rate and the length field is set to extend for the full duration of the IEEE 802.11n packet. Following the legacy portion of the preamble, the IEEE 802.11n preamble includes a HT-SIG 328 having additional configuration information for the IEEE 802.11n devices. In addition, block 330, which includes an HT-STF (high throughput short-training field) 332 and a plurality of HT-LTFs 334, is used to report the channel coefficients (e.g., I/Q samples) in the HT mode. The block 330 is followed by a data field 336.

It should be noted that no matter whether the non-HT format PPDU or the HT-mixed format PPDU is used, the channel station information is stored in the preamble of the non-HT format PPDU or the HT-mixed format PPDU. In addition, the receiver device 220 can obtain the channel station information from the received packet without de-packetizing the data portion of the received packet.

Figure 2B:
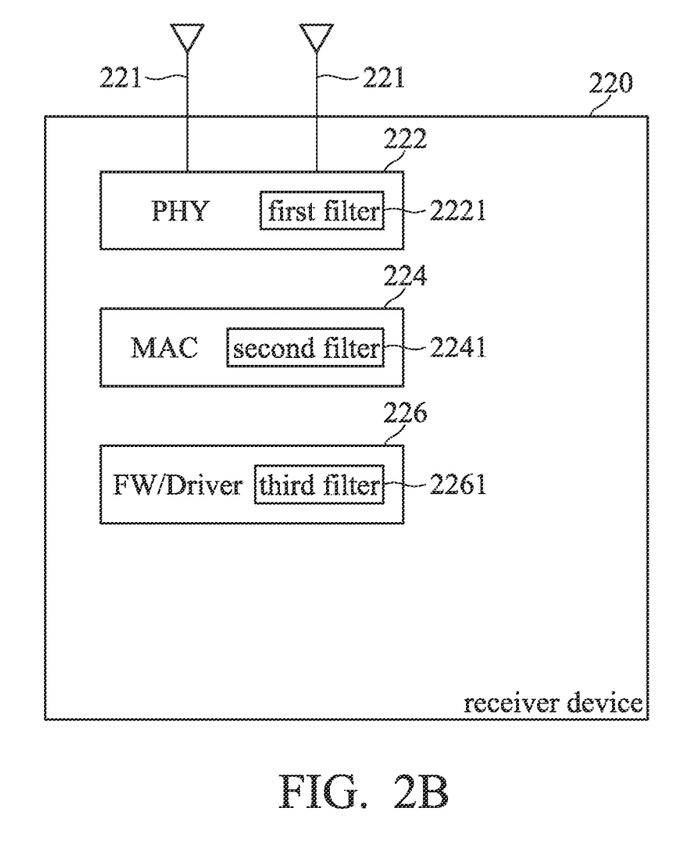
FIG. 2B is a simplified block diagram of the receiver device 220 in accordance with the embodiment of FIG. 2A.

FIG. 2B is a simplified block diagram of the receiver device 220 in accordance with the embodiment of FIG. 2A.

Referring to FIG. 1 and FIGS. 2A and 2B, the receiver device 220 may be implemented by the wireless-communication device 100. For example, the receiver device 220 may include antennas 221, physical layer circuitry (PHY) 222, media-access-control layer circuitry (MAC) 224, and a firmware/driver layer (FW/Driver) 226. PHY 222 and MAC 224 may be HEW compliant layers and may also be compliant with one or more legacy IEEE 802.11 standards. MAC 224 may be arranged to configure PPDUs, and PHY 222 may be arranged to transmit and receive PPDUs through the antennas 221. In some embodiments, the PHY 222 and MAC 224 can be disposed in the integrated circuit 120 shown in FIG. 1, and the FW/Driver layer 226 may be implemented by the processor 130 shown in FIG. 1.

In this embodiment, PHY 222 may include a first filter 2221 that allows packets having one or more first features (e.g., parameters or characteristics) to be processed by the FW/Driver layer 226. For example, the first features may include, but not limited to, a packet type, packet length, modulation type, AGC (Auto Gain Control) value, Tx/Rx path, BF (beamforming), ACI (adjacent channel interference), CCI (co-channel interference), RSSI (received signal strength indication), MCS (Modulation Coding Scheme), DBW (data bandwidth), SNR (signal-to-noise ratio), and PDP (Power Delay Profile) of the received packet.

In addition, the packet type of the received packet defined in the first filter 2221 may include, but not limited to an ICMP packet, QoS (Quality of Service) packet, beacon packet, Ack (Acknowledge) packet, HE (High Efficiency) packet, VHT (Very High Throughput) packet, EHT (Extremely High Throughput) packet, and NDP (Null Data Packet) packet. The packet length specified in the first filter 2221 may indicate a threshold packet length, where the received packet having a packet length longer than the threshold packet length can pass through the first filter. Alternatively, the received packet having a packet length that is equal to or shorter than the threshold packet length can pass through the first filter, depending on practical conditions. The modulation type specified in the first filter 2221 may include, but not limited to, DSSS (direct sequence spread spectrum), FHSS (frequency hopping spread spectrum), OFDM (Orthogonal Frequency Division Multiplexing), MIMO-OFDM (Multi-Input Multi-Output Orthogonal Frequency Division Multiplexing), mmWave, etc.

In addition, MAC 224 may also include a second filter 2241 that allows packets having one or more second features (e.g., parameters or characteristics) to be processed by the FW/Driver layer 226. The second features may include, but not limited to, a packet type, MAC address, or packet length of the received packet. For example, the second filter 2241 may include a MAC address list that includes one or more specific MAC addresses, and the second filter 2241 will filter out the received packet having a MAC address other than the specific MAC addresses defined in the MAC address list. In other words, the received packet having a MAC address in the specific MAC addresses of the MAC address list can pass through the second filter 2241, and then it is processed by the FW/Driver layer 226.

In addition, the FW/Driver layer 226 may also include a third filter 2261 that allows packets having one or more third features to be processed by the FW/Driver layer 226. The third features may include, but not limited to, a packet type or packet length of the received packet. It should be noted that the first features, second features, and third features respectively used in the first filter 2221, second filter 2241, and third filter 2261 can be defined by preset values stored in a non-volatile memory, and they can be changed by the user manually.

Figure 4A:
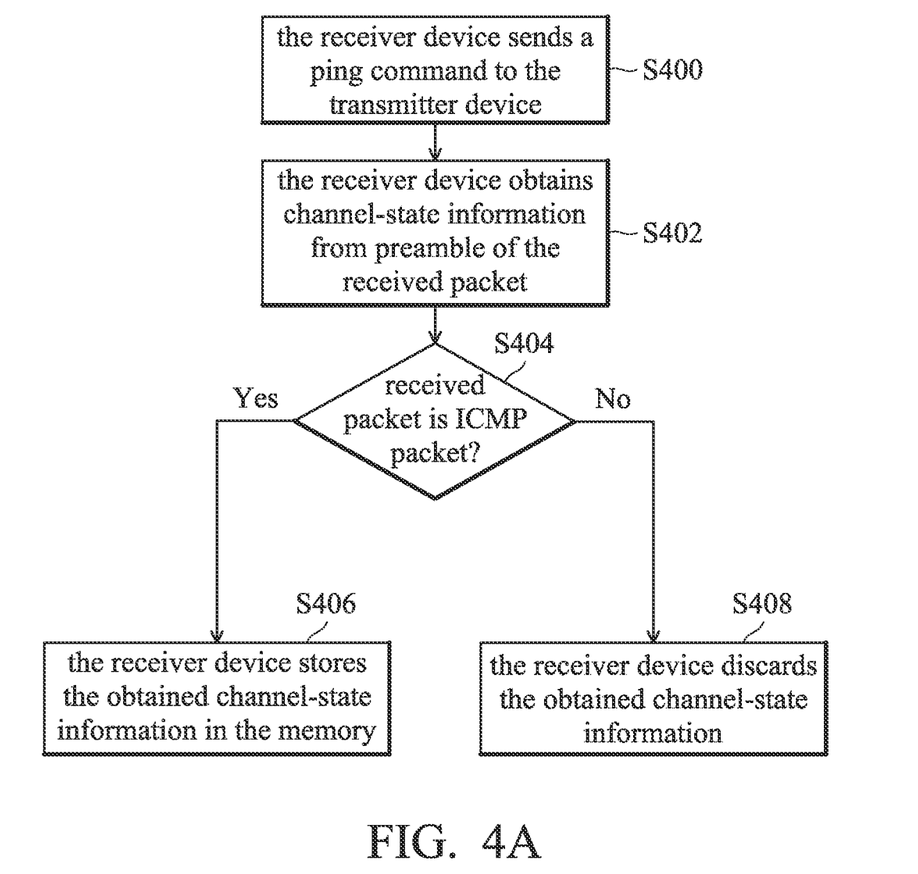
FIGS. 4A to 4F are flow charts of a method for filtering noises of channel-state information in wireless communication in accordance with different embodiments of the invention.

FIG. 4A is a flow chart of a method for filtering noises of channel-state information in wireless communication in accordance with an embodiment of the invention. Please refer to FIG. 2A and FIG. 4A.

In an embodiment, the request packet emitted by the receiver device 220 (i.e., the device receiving the channel station information) and the reply packet emitted by the transmitter device 210 (i.e., the device transmitting the channel-state information) may be ICMP (Internet Control Message Protocol) packets or a non-ICMP packets. When the receiver device 220 wants to request channel-state information from the transmitter device 210, the receiver device 220 may send a ping command (e.g., an ICMP packet of "echo request") to the transmitter device 210 (step S400). In response to the ICMP packet of "echo request" received from the receiver device 220, the transmitter device 210 may send an ICMP packet of "echo reply" to the receiver device 220 in addition to other Rx packets. Afterwards, the receiver device 220 may obtain the channel-state information from the preamble of the received packet (i.e., may be the ICMP packet of "echo reply" or other Rx packets using a protocol other than ICMP) (step S402), and determine whether the packet type of the received packet is an ICMP type (step S404). In response to the determination that the packet type of the received packet is the ICMP type, the receiver device 220 may store the obtained channel-state information in the memory 140 for subsequent usage (step S406). In response to the determination that the packet type of the received packet is a non-ICMP type, the receiver device 220 may discard the obtained channel-state information (S408).

Accordingly, the receiver device 220 may obtain desired channel-state information from the ICMP packet of "echo reply", such that the CSI quality can be improved, and the receiver device 220 can more accurately estimate the status of the channel between the transmitter device 210 and the receiver device 220.

Figure 4B:
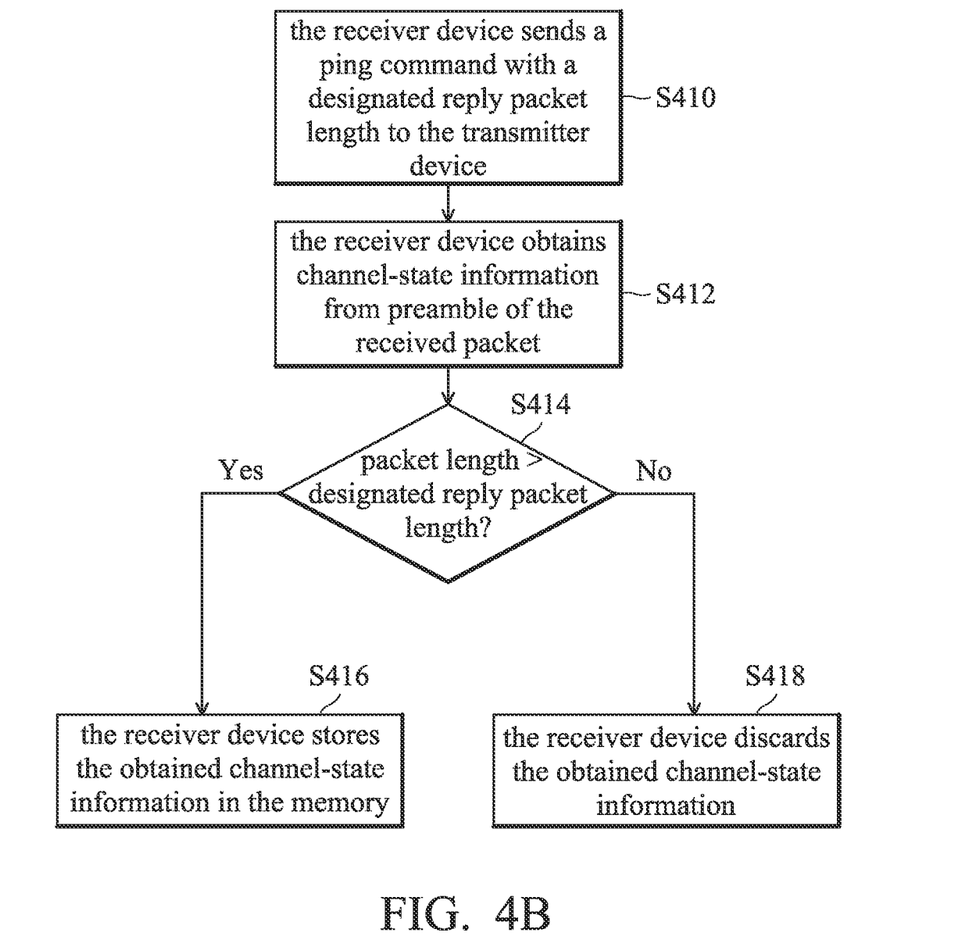

FIG. 4B is a flow chart of a method for filtering noises of channel-state information in wireless communication in accordance with an embodiment of the invention. Please refer to FIG. 2A and FIG. 4B.

In another embodiment, when the receiver device 220 wants to request channel-state information from the transmitter device 210, the receiver device 220 may send a ping command (e.g., an ICMP packet of "echo request") with a designated reply packet length (e.g., 500 bytes, but not limited) to the transmitter device 210 (step S410). In response to the ICMP packet of "echo request" received from the receiver device 220, the transmitter device 210 may send an ICMP packet of "echo reply" having the designated reply packet length to the receiver device 220 in addition to other Rx packets. Afterwards, the receiver device 220 may obtain the channel-state information from the preamble of the received packet (i.e., may be the ICMP packet of "echo reply" or other Rx packets using a protocol other than ICMP) (step S412), and determine whether the packet length of the received packet is longer than the designated reply packet length (step S414). In response to the determination that the packet length of the received packet is longer than the designated reply packet length, the receiver device 220 may store the obtained channel-state information in the memory 140 for subsequent usage (step S416). In response to the determination that the packet length of the received packet is shorter than or equal to the designated reply packet length, the receiver device 220 may discard the obtained channel-state information (step S418).

Accordingly, the receiver device 220 may obtain desired channel-state information from the packet having a packet length longer than the designated packet length, which can improve CSI quality and allow the receiver device 220 to more accurately estimate the status of the channel between the transmitter device 210 and the receiver device 220.

Figure 4C:
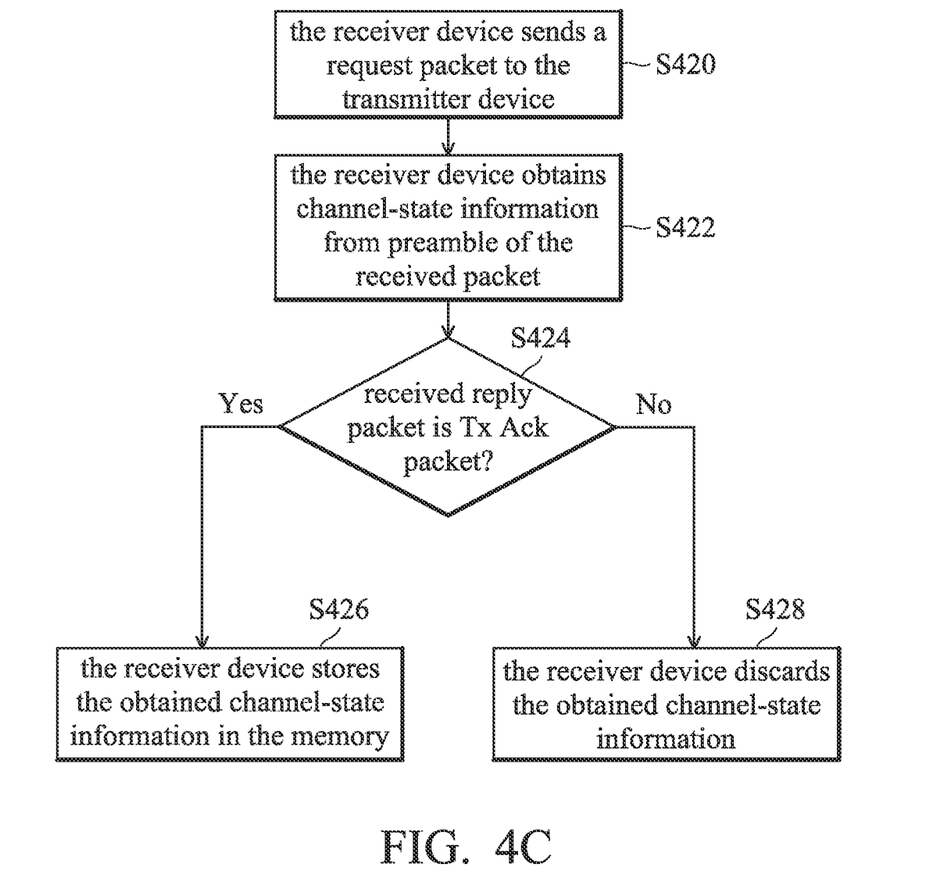

FIG. 4C is a flow chart of a method for filtering noises of channel-state information in wireless communication in accordance with yet another embodiment of the invention. Please refer to FIG. 2A and FIG. 4C.

In yet another embodiment, when the receiver device 220 wants to request channel-state information from the transmitter device 210, the receiver device 220 may send a request packet to the transmitter device 210 (step S420), where the request packet may be of any packet type, such as ICMP, QoS, beacon, HE, VHT, EHT, NDP, etc., but the invention is not limited thereto. In response to the request packet received from the receiver device 220, the transmitter device 210 may send a reply packet or reply frame to the receiver device 220 in addition to other Rx packets or frames. Afterwards, the receiver device 220 may obtain the channel-state information from the preamble of the received reply packet (step S422), and determine whether the received reply packet is a Tx AcK (Acknowledgment) packet (step S424). It should be noted that the reply packet may be one of the Rx packets received by the receiver device 220.

In response to the determination that the received packet is a Tx AcK (Acknowledgment) packet, the receiver device 220 may store the obtained channel-state information in the memory 140 for subsequent usage (step S426). In response to the determination that the received packet is not a Tx AcK (Acknowledgment) packet, the receiver device 220 may discard the obtained channel-state information (step S428).

Accordingly, the receiver device 220 may obtain desired channel-state information from the Tx Ack packet, such that the CSI quality can be improved, and the receiver device 220 can more accurately estimate the status of the channel between the transmitter device 210 and the receiver device 220.

Figure 4D:
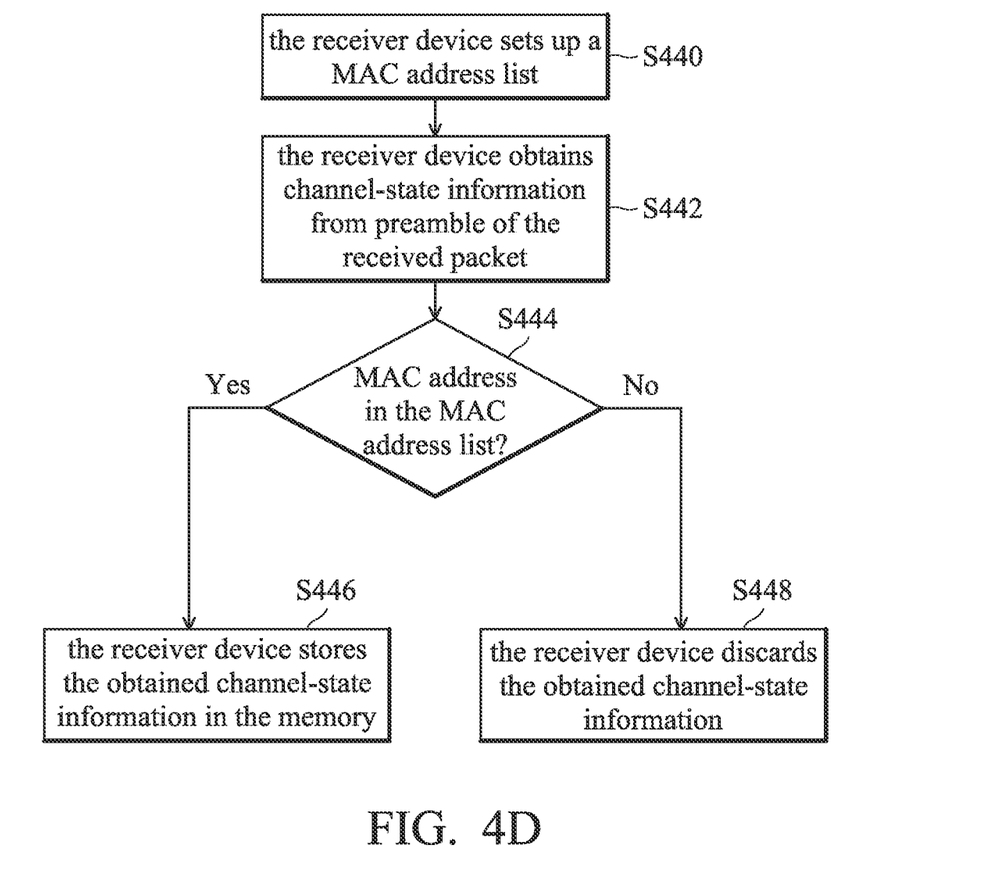

FIG. 4D is a flow chart of a method for filtering noises of channel-state information in wireless communication in accordance with yet another embodiment of the invention. Please refer to FIG. 2A and FIG. 4D.

In yet another embodiment, when the receiver device 220 wants to request channel-state information from the transmitter device 210, the receiver device 220 may set up a MAC address list that includes one or more specific MAC addresses (step S440). The receiver device 220 may obtain the channel-state information from the preamble of the Rx packet (step S442), and determine whether the MAC address indicated in the Rx packet is within the MAC address list (step S444). For example, the MAC 224 of the receiver device 220 may include the second filter 2241 to perform the aforementioned MAC-address filtering operations.

In response to the determination that the MAC address indicated in the Rx packet is within the MAC address list, the receiver device 220 may store the obtained channel-state information in the memory 140 for subsequent usage (step S446). In response to the determination that the MAC address indicated in the Rx packet is not within the MAC address list, the receiver device 220 may discard the obtained channel-state information (step S448).

Accordingly, the receiver device 220 may obtain desired channel-state information from the Rx packet having the MAC address within the MAC address list, such that the CSI quality can be improved, and the receiver device 220 can more accurately estimate the status of the channel between the transmitter device 210 and the receiver device 220.

Figure 4E:
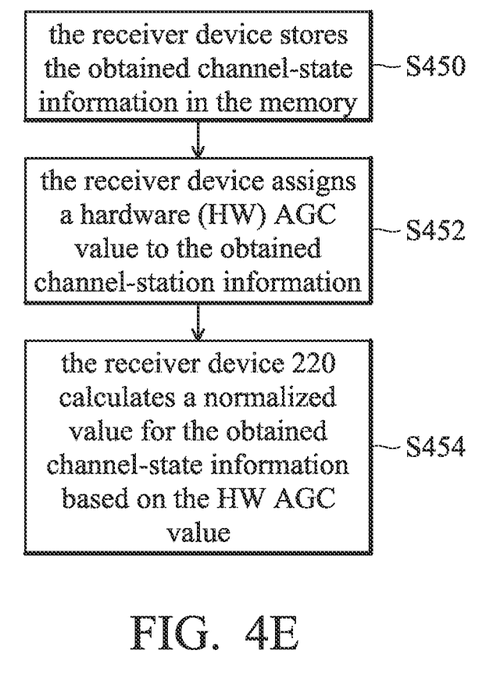

FIG. 4E is a flow chart of a method for filtering noises of channel-state information in wireless communication in accordance with yet another embodiment of the invention. Please refer to FIG. 2A and FIG. 4E.

In yet another embodiment, the receiver device 220 may obtain the channel-state information from the preamble of the received packet (step S450), and assign a hardware (HW) AGC value to the obtained channel-station information (step S452). Afterwards, the receiver device 220 may calculate a normalized value for the obtained channel-state information based on the calculated HW AGC value (step S454). For example, given that the range of the HW AGC value is between 1 to 10, if the HW AGC value of the currently obtained channel-state information is 3, the receiver device 220 may multiply the current CSI value with (3/10) to obtain the normalized CSI value.

In some embodiments, the receiver device 220 may set a threshold to filter out the received packet carrying the CSI which has a normalized CSI value lower than the threshold, and the CSI in this received packet will be discarded by the receiver device 220. In addition, the received packet carry the CSI which has a normalized CSI value equal to or higher than the threshold will be stored in the memory 140 for subsequent use. As a result, the received packets that have higher CSI quality can be kept so as to better estimate the status of the channel between the transmitter device 210 and receiver device 220.

Figure 4F:
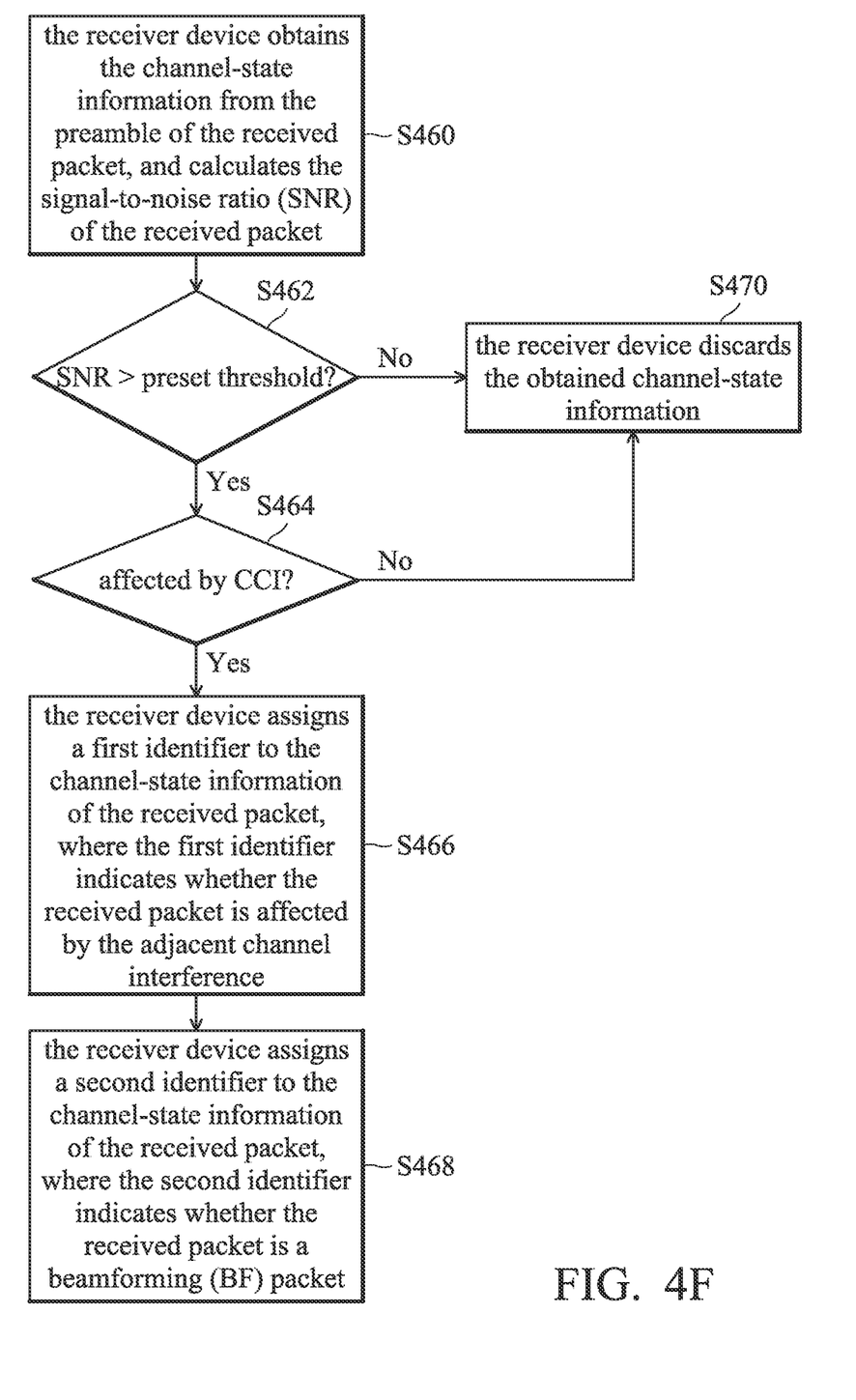

FIG. 4F is a flow chart of a method for filtering noises of channel-state information in wireless communication in accordance with yet another embodiment of the invention. Please refer to FIG. 2A and FIG. 4F.

In yet another embodiment, the receiver device 220 may obtain the channel-state information from the preamble of the received packet, and calculate the signal-to-noise ratio (SNR) of the received packet (step S460). Then, the receiver device 220 may determine whether the calculated SNR is greater than a preset threshold (e.g., 3, but not limited) (S462). In response to the determination that the calculated SNR is greater than the preset threshold, the receiver device 220 may discard the obtained channel-state information (step S470). In response to the determination that the calculated SNR is not greater than the preset threshold, the receiver device 220 may determine whether the received packet is affected by the co-channel interference (CCI) (step S464).

In response to the determination that the received packet is affected by the CCI, the receiver device 220 may discard the channel-state information of the received packet (step S470). In response to the determination that the received packet is not affected by the CCI, the receiver device 220 may assign a first identifier to the channel-state information of the received packet, where the first identifier indicates whether the received packet is affected by the adjacent channel interference (ACI) (step S466). In step S468, the receiver device 220 may assign a second identifier to the channel-state information of the received packet (step S468), where the second identifier indicates whether the received packet is a beamforming (BF) packet.

In some embodiments, the receiver device 220 may filter out or recognize the received packets by setting one or more preset conditions, such as CCI, ACI, BF, etc. For example, if the receiver device 220 has assigned the received packet with identifiers of ACI and BF, the first filter 2221 in PHY 222 of the receiver device 220 may recognize that the received packet by the identifiers of ACI and BF. Thus, the receiver device 220 may store the channel-state information obtained from the received packet in the memory 140 for subsequent use. Alternatively, the receiver device 220 may discard the channel-state information obtained from the received packet when the identifiers of the received packet match some predefined conditions.

Figure 5A:
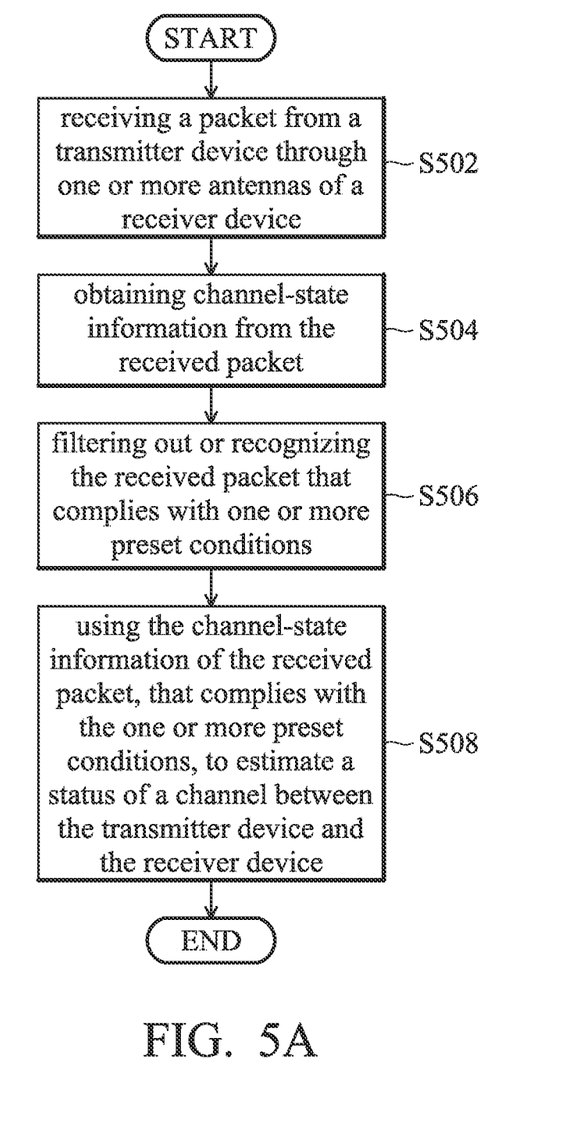
FIG. 5A is a flow chart of a method for filtering noises of channel-state information in wireless communication in accordance with yet another embodiment of the invention.

FIG. 5A is a flow chart of a method for filtering noises of channel-state information in wireless communication in accordance with yet another embodiment of the invention. Please refer to FIG. 2A, FIGS. 4A-4F, and FIG. 5A.

The methods described in the embodiments FIGS. 4A-4F can be collectively represented by the method shown in FIG. 5A. For example, in step S502, a packet is received from the transmitter device 210 through one or more antennas of the receiver device 220. The receiver device 220 may send a ping command (e.g., an echo request command with or without a particular condition, such as a designated packet length) before receiving the packet. Alternatively, the receiver device 220 may also receive Rx packets from the transmitter device 210, and filter out the Rx packets that comply with one or more preset conditions set by the first filter 2221, second filter 2241, and third filter 2261. In step S504, the channel-state information is obtained from the received packet.

In step S506, the received packet that complies with one or more preset conditions is filtered out or recognized. For example, the one or more preset conditions may be (1) a particular packet type or frame as described in the embodiment of FIG. 4A; (2) a threshold packet length, a threshold signal strength, particular MAC addresses in a preset MAC address list, and a data-rate range as described in the embodiment of FIG. 4A; or (3) Tx Ack packet from the transmitter device 210, but the invention is not limited thereto.

In step S508, the channel-state information of the received packet, that complies with the one or more preset conditions, are used to estimate a status of a channel between the transmitter device 210 and the receiver device 220. Accordingly, the receiver device 220 may obtain desired channel-state information from the received packet that complies with the one or more preset conditions, such that the CSI quality can be improved, and the receiver device 220 can more accurately estimate the status of the channel between the transmitter device 210 and the receiver device 220.

Figure 5B:
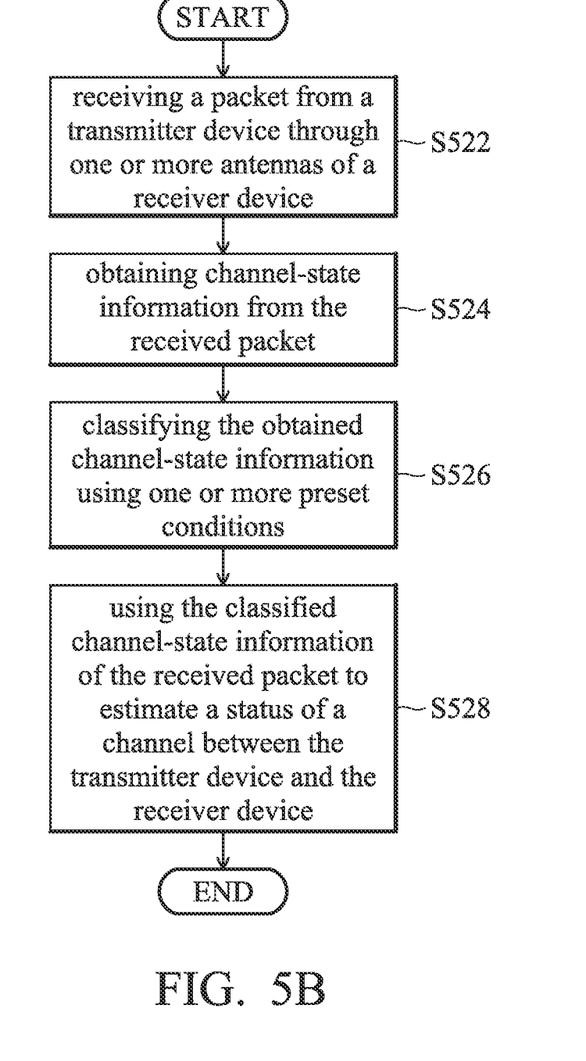
FIG. 5B is a flow chart of a method for filtering noises of channel-state information in wireless communication in accordance with yet another embodiment of the invention.

FIG. 5B is a flow chart of a method for filtering noises of channel-state information in wireless communication in accordance with yet another embodiment of the invention. Please refer to FIG. 2A, FIGS. 4E-4F, and FIG. 5B.

In FIG. 5B, steps S522 and S524 are similar to steps S502 and S504 in FIG. 5A. The difference between FIG. 5A and FIG. 5B is that the obtained channel-state information are classified using one or more preset conditions (step S526) in FIG. 5B. For example, the one or more preset conditions may be a particular packet type, modulation type, AGC value, Tx/Rx path, BF, ACI, CCI, RSSI, SNR, PDP, or a combination thereof, but the invention is not limited thereto. In step S528, the classified channel-state information of the received packet is used to estimate a status of a channel between the transmitter device 210 and the receiver device 220. Accordingly, the receiver device 220 may obtain desired channel-state information from the received packet that complies with the one or more preset conditions, such that the CSI quality can be improved, and the receiver device 220 can more accurately estimate the status of the channel between the transmitter device 210 and the receiver device 220.

In view of the above, a device and a method for filtering noises of channel-state information in wireless communication are provided, which are capable of using the channel-state information in the received packet, which complies with one or more particular condition, as the source of the channel-state information to be used by the receiver device, thereby improving the quality of the channel-state information used by the receiver device, and being better able to estimate the status of the channel between the transmitter device and the receiver device.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any device that can contain, store, communicate, propagate, or transport the program for use by or in connection with the instruction execution system, device, or device.

The medium may be an electronic, magnetic, optical, electromagnetic, infrared, semiconductor system (or device or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A device, comprising:
one or more antennas; and
a circuit, configured to receive a packet from a transmitter device through the antennas, and obtain channel-state information from the received packet;
wherein the circuit comprises one or more filters to filter out or recognize the received packet that complies with one or more preset conditions,
wherein the circuit uses the channel-state information of the received packet, which complies with the one or more preset conditions, to estimate a status of a channel between the transmitter device and the device;
wherein the one or more preset conditions indicate a threshold packet length, a threshold signal strength, particular MAC addresses in a preset MAC address list, and a data-rate range;
wherein the circuit sends a ping command with the threshold packet length to the transmitter device and receives a reply packet from the transmitter device through the antennas,
wherein the circuit determines whether the received packet has a packet length that is longer than the threshold packet length,
wherein in response to the determination that the received packet has the packet length that is longer than the threshold packet length, the circuit uses the channel-state information of the received packet to estimate the status of the channel between the transmitter device and the receiver device.

2. The device as claimed in claim 1, wherein the one or more preset conditions indicate a particular frame or packet type.

3. The device as claimed in claim 2, wherein the particular frame or packet type comprises an ICMP (Internet Control Message Protocol) packet, QoS (Quality of Service) packet, beacon packet, Ack (Acknowledge) packet, HE (High Efficiency) packet, VHT (Very High Throughput) packet, EHT (Extremely High Throughput) packet, and NDP (Null Data Packet) packet.

4. The device as claimed in claim 3, wherein the circuit comprises a physical (PHY) layer and a media-access-control (MAC) layer, and the one or more filters are implemented by the PHY layer and the MAC layer.

5. The device as claimed in claim 1, wherein the circuit discards the channel-state information of the received packet that does not comply with the one or more preset conditions.

6. The device as claimed in claim 1, wherein the circuit determines whether a MAC address of the received packet is in the preset MAC address list,
wherein in response to the determination that the MAC address in the received packet is in the preset MAC address list, the circuit uses the channel-state information of the received packet to estimate the status of the channel between the transmitter device and the receiver device,
wherein in response to the determination that the MAC address in the received packet is not in the preset MAC address list, the circuit discards the channel-state information obtained from the received packet.

7. A method, comprising:
receiving a packet from a transmitter device through one or more antennas of a receiver device;
obtaining channel-state information from the received packet;
filtering out or recognizing the received packet that complies with one or more preset conditions; and
using the channel-state information of the received packet, which complies with the one or more preset conditions, to estimate a status of a channel between the transmitter device and the receiver device;
wherein the one or more preset conditions indicate a threshold packet length, a threshold signal strength, particular MAC addresses in a preset MAC address list, and a data-rate range;
wherein the method further comprises:
sending a ping command with the threshold packet length to the transmitter device and receiving a reply packet from the transmitter device through the antennas;
determining whether the received packet has a packet length that is longer than the threshold packet length; and
in response to the determination that the received packet has the packet length that is longer than the threshold packet length, using the channel-state information of the received packet to estimate the status of the channel between the transmitter device and the receiver device.

8. The method as claimed in claim 7, wherein the one or more preset conditions indicate a particular frame or packet type.

9. The method as claimed in claim 8, wherein the particular frame or packet type comprises an ICMP (Internet Control Message Protocol) packet, QoS (Quality of Service) packet, beacon packet, Ack (Acknowledge) packet, HE (High Efficiency) packet, VHT (Very High Throughput) packet, EHT (Extremely High Throughput) packet, and NDP (Null Data Packet) packet.

10. The method as claimed in claim 9, further comprising:
discarding the channel-state information of the received packet that does not comply with the one or more preset conditions.

11. The method as claimed in claim 7, further comprising:
determining whether a MAC address of the received packet is in the preset MAC address list;
in response to the determination that the MAC address in the received packet is in the preset MAC address list, using the channel-state information of the received packet to estimate the status of the channel between the transmitter device and the receiver device; and
wherein in response to the determination that the MAC address in the received packet is not in the preset MAC address list, discarding the channel-state information obtained from the received packet.

12. The method as claimed in claim 7, further comprising:
sending a request packet to the transmitter device and receiving a reply packet from the transmitter device through the one or more antennas;
obtaining the channel-state information from a preamble of the reply packet;
determining whether the reply packet is a Tx Ack (Acknowledgement) packet; and
in response to the determination that the received packet is the Tx Ack packet, using the channel-state information of the reply packet to estimate the status of the channel between the transmitter device and the receiver device.

* * * * *